(12) United States Patent
Park et al.

(10) Patent No.: US 12,189,948 B2
(45) Date of Patent: Jan. 7, 2025

(54) DEVICE AND METHOD TO MINIMIZE OFF-CHIP ACCESS BETWEEN HOST AND PERIPHERALS

(71) Applicant: SAMSUNG ELECTRONICS CO., LTD., Suwon-si (KR)

(72) Inventors: Seongwook Park, Suwon-si (KR); Deok Jae Oh, Suwon-si (KR); Youngsam Shin, Suwon-si (KR); Yeongon Cho, Suwon-si (KR); Yongmin Tai, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 18/191,254

(22) Filed: Mar. 28, 2023

(65) Prior Publication Data

US 2024/0134522 A1 Apr. 25, 2024
US 2024/0231614 A9 Jul. 11, 2024

(30) Foreign Application Priority Data

Oct. 25, 2022 (KR) .................. 10-2022-0138697

(51) Int. Cl.
*G06F 12/00* (2006.01)
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0658* (2013.01); *G06F 3/0673* (2013.01); *G06F 12/0223* (2013.01)

(58) Field of Classification Search
CPC .................... G06F 3/0658; G06F 12/0223
See application file for complete search history.

(56) References Cited

U.S. PATENT DOCUMENTS

| 6,516,397 | B2 * | 2/2003 | Roy .................. G06F 12/08 711/170 |
| 10,831,488 | B1 | 11/2020 | Bainville et al. |
| 11,074,009 | B2 | 7/2021 | Jean |
| 2019/0121549 | A1 * | 4/2019 | Satoyama ............ G06F 3/0688 |
| 2020/0192715 | A1 | 6/2020 | Wang et al. |
| 2021/0042044 | A1 * | 2/2021 | Pohlack ................ G06F 3/0661 |
| 2024/0012565 | A1 * | 1/2024 | Erickson ............ G11C 11/4096 |
| 2024/0160579 | A1 * | 5/2024 | Arelakis ............... G06F 3/0659 |

FOREIGN PATENT DOCUMENTS

| KR | 10-2368970 | 3/2022 |
| KR | 10-2024-0029419 | 3/2024 |

* cited by examiner

*Primary Examiner* — John A Lane
(74) *Attorney, Agent, or Firm* — F. CHAU & ASSOCIATES, LLC

(57) ABSTRACT

A near-memory processing unit is configured to compress a page present in a normal memory space of a memory when receiving a swap-out command from a host, allocate a memory area in which the compressed page is to be stored in a compressed memory space which is a memory area previously allocated by the host, copy the compressed page into the allocated memory area, generate an entry corresponding to the compressed page, and insert the generated entry into an entry tree.

20 Claims, 11 Drawing Sheets

DEVICE AND METHOD TO MINIMIZE OFF-CHIP ACCESS BETWEEN HOST AND PERIPHERALS

CROSS-REFERENCE TO RELATED APPLICATIONS

This application claims priority under 35 USC § 119(a) to Korean Patent Application No. 10-2022-0138697 filed on Oct. 25, 2022, in the Korean Intellectual Property Office, the disclosure of which is incorporated by reference herein in its entirety.

BACKGROUND

The present disclosure relates to managing off-chip access between a host and peripherals.

Some computers or electronic devices support memory management techniques to improve the efficiency of memory usage. Swapping is an example of a memory management technique that allows for more efficient memory usage. Swapping refers to moving a portion of data (e.g., processes) stored in one memory (e.g., memory previously allocated to an application program) to an auxiliary memory. For example, when there is insufficient main memory to be allocated to an application program in a system, data may be moved to an auxiliary memory having a relatively large capacity (e.g., a solid-state drive (SSD) or a hard disk drive (HDD)). The data may be later swapped back into main memory.

SUMMARY

This Summary introduces a selection of concepts and does not limit the scope of the claimed subject matter. Aspects of the present disclosure provide a near-memory processing unit and a data processing method. Embodiments of the disclosure may be implemented in a mobile or edge terminal having limited hardware resources.

In one aspect, a near-memory processing unit includes: a compressor configured to, in response to a swap-out command received from a host, compress a page disposed in a normal memory space of a memory to obtain a compressed page, wherein the near-memory processing unit is separated from the host; and a memory controller configured to, in response to the swap-out command, store the compressed page in a compressed memory space.

The memory controller may be further configured to, in response to the swap-out command: allocate a memory area in which the compressed page is to be stored in the compressed memory space of the memory and copy the compressed page into the allocated memory area.

The memory controller may be further configured to, in response to the swap-out command: update an entry tree configured in a tree structure that is based on one or more compressed pages by generating a entry corresponding to the compressed page and inserting the entry into the entry tree.

The compressed memory space may be a memory area allocated in advance in the memory by the host before the page is compressed by the compressor.

The near-memory processing unit may further include a page cache configured to manage memory areas of the compressed memory space, wherein the page cache may be configured to manage a total used page indicating the number of compressed pages in the compressed memory space, and request the host to additionally allocate a memory area to the compressed memory space in response to the total used page exceeding a threshold number of pages.

The compressor may be configured to transmit size information of the compressed page to the page cache, and request the page cache to allocate a memory area for storing the compressed page in the compressed memory space.

The page cache may be configured to increase the total used page by a size of the compressed page, in response to the size information of the compressed page received from the compressor.

The page cache may be configured to specify an address of the memory area in which the compressed page is to be stored, and transmit the specified address and the size information of the compressed page to the memory controller, wherein the memory controller may be configured to generate an entry of an entry tree based on meta information of the compressed page that includes an address of the compressed page and the size information of the compressed page.

In another aspect, a near-memory processing unit includes: a decompressor configured to, in response to a swap-in command received from a host, decompress a compressed page disposed in a compressed memory space of a memory to obtain a decompressed page, wherein the near-memory processing unit is separated from the host; and a memory controller configured to, in response to the swap-in command, store the decompressed page in a normal memory space of the memory.

The memory controller may be further configured to, in response to the swap-in command: search an entry tree configured in a tree structure that is based on one or more compressed pages for an entry corresponding to the compressed page; and read an address of the compressed page included in the entry.

The memory controller may be further configured to, in response to the swap-in command, update the entry tree by deleting the entry from the entry tree.

The near-memory processing unit may further include a page cache configured to manage a memory area of the compressed memory space, wherein the page cache may be configured to manage a total used page indicating the number of compressed pages in the compressed memory space, and request the host to additionally allocate a memory area to the compressed memory space in response to the total used page exceeding a threshold number of pages.

The memory controller may be configured to read the compressed page, decrypt the compressed page through a decryptor, and transmit the decrypted page to the decompressor.

The decompressor may be configured to transmit, to the page cache, a signal indicating an end of decompression of the compressed page, wherein the page cache may be configured to decrease the total used page by a size of the compressed page when receiving the signal indicating the end of the decompression of the compressed page from the decompressor.

In another aspect, a data processing method includes: receiving, at a near-memory processing unit, a swap-out command from a host, wherein the host is separated from the near-memory processing unit; in response to the received swap-out command, compressing a page disposed in a normal memory space of a memory; allocating a memory area in which the compressed page is to be stored in a compressed memory space of the memory; copying the compressed page into the allocated memory area; and updating an entry tree configured in a tree structure that is based on one or more compressed pages by generating a entry corresponding to the compressed page and inserting the entry into the entry tree.

The compressed memory space may be a memory area allocated in advance in the memory by the host before the page is compressed.

The data processing method may further include managing a total used page indicating the number of compressed pages in the compressed memory space; and when the total used page exceeds a threshold number of pages, requesting the host to additionally allocate a memory area to the compressed memory space.

The data processing method may further include increasing the total used page by a size of the compressed page when the page has been compressed.

The allocating of the memory area in which the compressed page is to be stored may include specifying an address of the memory area in which the compressed page is to be stored, wherein the updating of the entry tree may include generating the entry based on meta information of the compressed page that includes an address of the compressed page and size information of the compressed page.

In another aspect, a data processing method includes: receiving, at a near-memory processing unit, a swap-in command from a host, wherein the host is separated from the near-memory processing unit; in response to the received swap-in command, searching an entry tree configured in a tree structure that is based on one or more compressed pages for an entry corresponding to a compressed page disposed in a compressed memory space of a memory; reading an address of the compressed page included in the entry; decompressing the compressed page; and updating the entry tree by deleting the entry from the entry tree.

The data processing method may further include managing a total used page indicating the number of compressed pages in the compressed memory space; and when the total used page exceeds a threshold number of pages, requesting the host to additionally allocate a memory area to the compressed memory space.

The decompressing of the compressed page may include reading the compressed page from the address of the compressed page, decrypting the compressed page through a decryptor and transmitting the decrypted page to a decompressor, wherein the data processing method may further include storing the page decompressed by the decompressor in a normal memory space of the memory.

The data processing method may further include decreasing the total used page by a size of the compressed page when decompression of the compressed page has been ended.

In another aspect, a method includes receiving, by a near-memory processing unit, a swap-out command from a host that is separated from the near-memory processing unit, wherein the swap-out command comprises an instruction to transfer data from a first memory space of a memory to a compressed memory space of the memory; compressing, by the near-memory processing unit, the data in response to the swap-out command to obtain compressed data; and storing, by the memory, the compressed data in the compressed memory space in response to the swap-out command.

The method may further include receiving, by the near-memory processing unit, a swap-in command from the host, wherein the swap-in command comprises an instruction to transfer the data from the compressed memory space to the normal memory space; decompressing, by the near-memory processing unit, the compressed data in response to the swap-in command to obtain decompressed data; and storing, by the memory, the decompressed data in the normal memory space in response to the swap-in command.

The method may further include searching, by the near-memory processing unit, an entry tree configured in a tree structure that is based on one or more compressed pages for an entry corresponding to the data; and reading an address of the data comprised in the entry.

The method may further include updating, by the near-memory processing unit, an entry tree configured in a tree structure that is based on one or more compressed pages by generating a entry corresponding to the compressed data and inserting the entry into the entry tree.

Other features and aspects will be apparent from the description, the drawings, and the claims.

Figure 1:
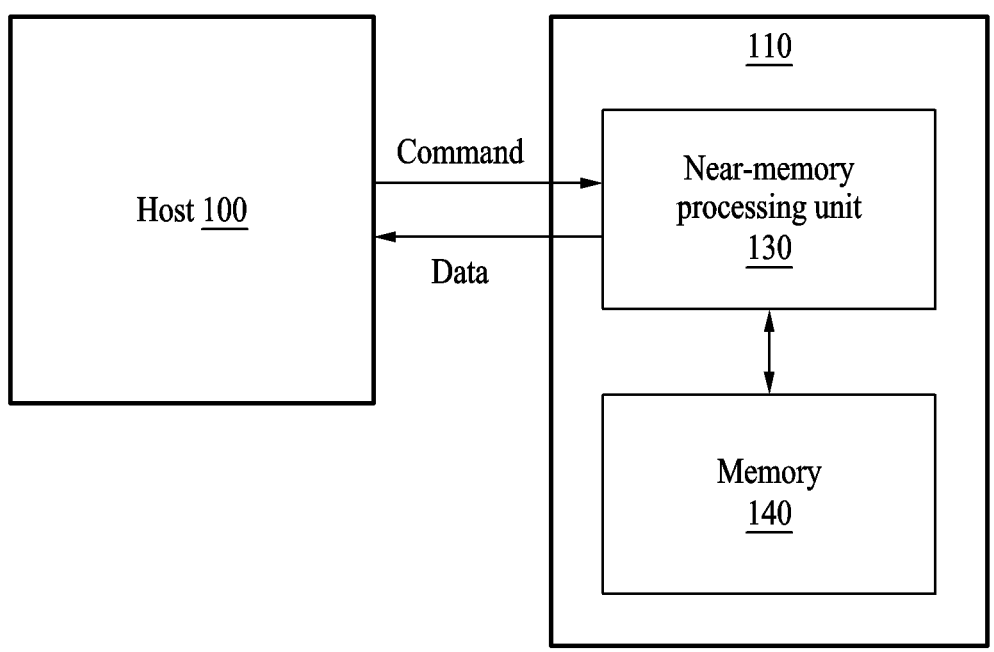
FIG. 1 illustrates an example of a data processing device.

Throughout the drawings and the description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The present disclosure relates to systems and methods for memory management, and in some examples, for managing off-chip access between a host and peripherals.

Some computers or electronic devices support memory management techniques to improve the efficiency of memory usage. Swapping is an example of a memory management technique that allows for more efficient memory usage. Swapping refers to moving data stored in one memory to another memory when there is insufficient room in main memory to support application programs or processes.

In some examples, moving data to an auxiliary memory may be costly (e.g., moving pages to and from virtual memory in a Linux system). Moving data from main memory to auxiliary memory and from auxiliary memory to main memory may include transmitting data through a system bus, and transmitting data through the system bus may be slow (e.g., slower than accessing main memory).

Because the latency associated with transmitting data through the system bus may be high, the performance of an application program may be degraded when data for the application program is to be moved from auxiliary memory to main memory.

Some embodiments of the present disclosure prevent or mitigate degradation in the performance of an application program using efficient techniques for compressing data and storing the compressed data in main memory for use. In some examples, a near-memory processing unit receives a swap-out command from a host, and the near-memory processing unit compresses the data and stores the compressed data in a compressed memory space of a memory in response to the swap-out command. In other examples, a near-memory processing unit receives a swap-in command from a host, and the near-memory processing unit decompresses the data and store the decompressed data in a normal memory space of a memory in response to the swap-in command.

By swapping data in and out of a normal memory space and a compressed memory space in a memory, a computing device may support various application programs despite having limited memory. Further, because data may be moved in and out of a compressed memory space in main memory, rather than moving data in and out of auxiliary memory through a system bus, the latency associated with moving data may be reduced, and the performance of application programs may be improved. In addition, a host may offload, to a near-memory processing unit, operations such as allocating a memory area for a compressed page and copying the compressed page into the allocated memory area. Thus, off-chip communication between the host and a memory or a near-memory processing unit may be minimized, and latency associated with compressing, decompressing, and storing data for memory management may also be minimized.

FIG. 1 illustrates an example of a data processing device.

Referring to FIG. 1, a data processing device 110 may process data. The data processing device 110 may include a near-memory processing unit 130 and a memory 140. The near-memory processing unit 130 may manage the memory 140 by processing data to be stored in the memory 140. The memory 140 may store instructions (or programs) executable by a processor. The instructions may include, for example, instructions for executing an operation of the processor and/or an operation of each component of the processor.

The memory 140 may be implemented as a volatile memory device or a non-volatile memory device. The volatile memory device may be implemented as a dynamic random-access memory (DRAM), a static RAM (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAIVI), a nanotube RRAIVI, a polymer RAM (PoRAM), a nano floating gate memory (NFGM), a holographic memory, a molecular electronic memory device, or an insulator resistance change memory.

The data processing device 110 may manage the memory 140 by performing swaps. A swap may refer to a memory management method that moves a portion of data in main memory to an auxiliary memory (e.g., a solid-state drive (SSD) or a hard disk drive (HDD)) with a relatively large capacity. The data processing device 110 may perform a swap when there is a shortage of an area of main memory to be allocated to an application program in a computing system.

In some examples, the data processing device 110 may also manage the memory 140 by performing zswaps. A zswap may refer to a method of compressing and storing data in a zswap area (e.g., a "compressed memory space") of memory when there is a shortage of a memory area to be allocated to an application program in a computing system. For example, the near-memory processing unit 130 may compress and store data to be moved to the compressed memory space, and the near-memory processing unit 130 may decompress the data to reuse the data when appropriate.

In one embodiment, a zswap is performed using a compressed write-back cache for swapped pages as a form of virtual memory compression. For example, instead of moving memory pages to a swap device when they are to be swapped out, a swap may perform compression and then store data in a memory dynamically allocated in system RAM. IN some cases, writeback to a swap device may be deferred or avoided.

According to an example embodiment, the near-memory processing unit 130 may perform operations of a zswap. According to an example embodiment, the near-memory processing unit 130 may compress data by performing the zswap. In some examples, the near-memory processing unit 130 may also perform other operations to manage the memory 140 based on being near the memory 140. Because the near-memory processing unit (e.g., rather than a host 100, such as a central processing unit (CPU)) may perform operations to manage the memory 140, a processing speed of an entire application program may be improved.

The near-memory processing unit 130 may be separated from (e.g., disposed apart from) the host 100. In some examples, the near-memory processing unit 130 may be implemented in different hardware from the host 100. In some examples, the near-memory processing unit 130 may be implemented in a different physical location from the host 100. As illustrated in FIG. 1, the near-memory processing unit 130 may be near the memory 140 (e.g., physically close to the memory 140), but examples may not be limited thereto, and the near-memory processing unit 130 may be inside the memory 140. Whether the near-memory processing unit 130 is near the memory 140 or inside the memory 140, the near-memory processing unit 130 may be in a position to access data stored in the memory 140 (e.g., rather than the host 100 accessing the memory 140 through a main data bus between the host 100 and the memory 140). Because the near-memory processing unit 130 may be near or inside the memory 140, and data in the memory 140 may be processed without passing through a data bus between the host 100 and the memory 140, the data may be processed more quickly.

The host 100 may be a main management entity of a computing system. The host 100 may be, for example, a CPU or a server. The host 100 may transmit a command to the near-memory processing unit 130.

The near-memory processing unit 130 may process data of the memory 140 by interworking with the host 100. The near-memory processing unit 130 may receive the command from the host 100. The command may include a swap-in command, a swap-out command, or both. The near-memory processing unit 130 may compress or decompress the data in response to the command received from the host 100. The near-memory processing unit 130 may manage an entry of the compressed data. The entry may represent information associated with the compressed data. The information associated with the compressed data may include, for example, an address of a memory area in which the compressed data is to be stored, a type of the compressed data, and size information of the compressed data. The near-memory processing unit 130 may generate an entry tree configured in a tree structure based on the compressed data. For example, the entry tree may be a binary tree with each entry corresponding to a node in the binary tree.

Figure 2:
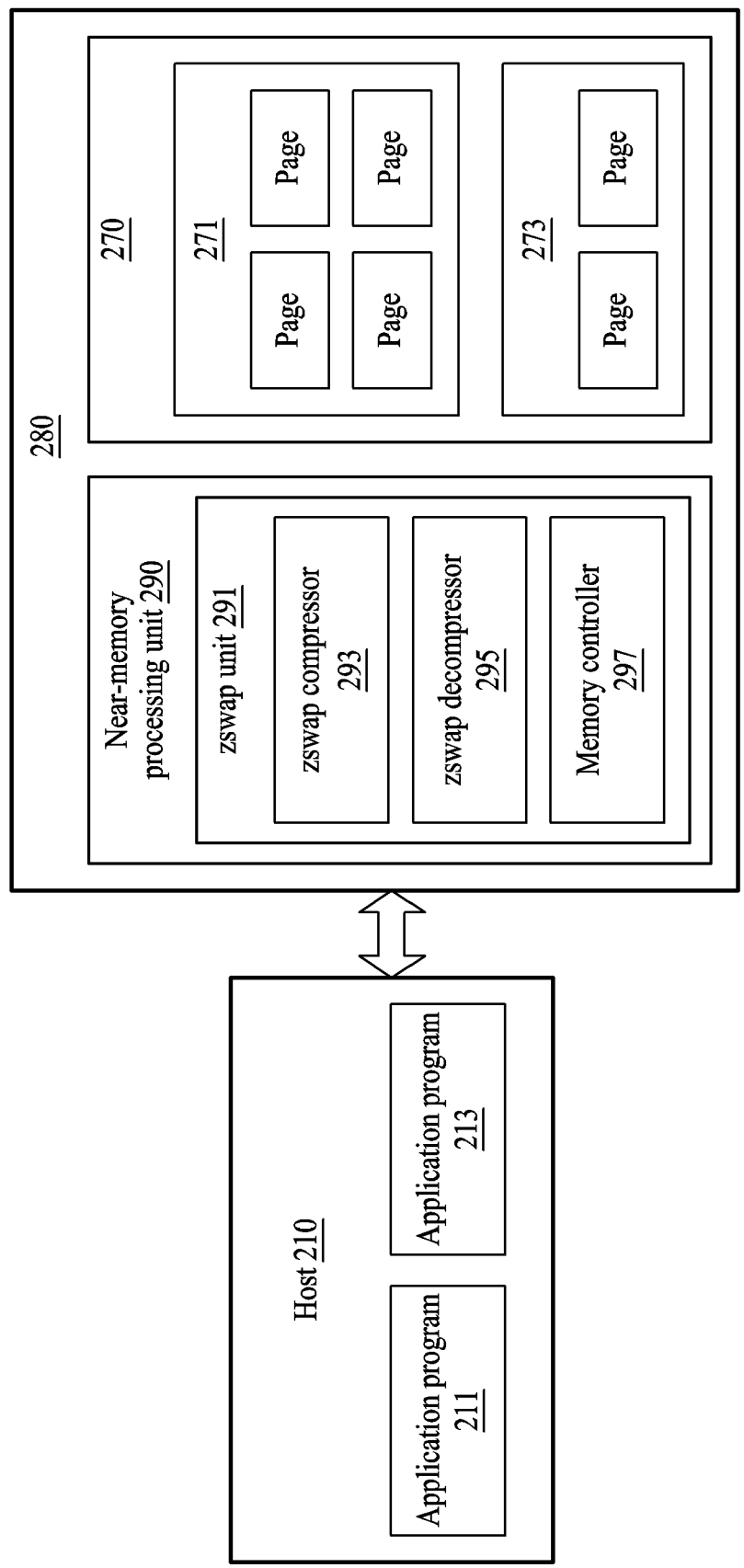
FIG. 2 illustrates an example implementation of the data processing device of FIG. 1.

FIG. 2 illustrates an example implementation of the data processing device 110 of FIG. 1.

Referring to FIG. 2, a host 210 (e.g., the host 100 of FIG. 1) may execute a plurality of application programs 211 and 213. The host 210 may manage data in a memory 270 (e.g., the memory 140 of FIG. 1) to execute the application programs 211 and 213.

A data processing device 280 (e.g., the data processing device 110 of FIG. 1) may include a near-memory processing unit 290 (e.g., the near-memory processing unit 130 of FIG. 1) and the memory 270. The memory 270 may include a normal memory space 271 (e.g., a memory space storing uncompressed data) and a compressed memory space 273. The near-memory processing unit 290 may include a zswap unit 291. The zswap unit 291 may include a zswap compressor 293, a zswap decompressor 295, and a memory controller 297.

Data of the application programs 211 and 213 may be stored in a unit of pages (e.g., 4 KB unit) in the normal memory space 271 of the memory 270. The data processing device 280 may compress a page stored in the normal memory space 271 through zswap and store the compressed page in the compressed memory space 273 if there is a shortage of memory area in the normal memory space 271. In some examples, a compressed page may be moved to an auxiliary memory (or an auxiliary memory unit as described herein, e.g., an SSD).

The near-memory processing unit 290 may receive a swap-out command from the host 210. The swap-out command may be a command for compressing a page stored in a normal memory space and storing the compressed page in a compressed memory space. For instance, the swap-out command may include instructions to compress data, allocate memory for the compressed data, copy the compressed data into the allocated memory, update an entry tree based on the compressed data, or perform some combination of these operations. The near-memory processing unit 290 may receive a zswap-offload-store command as the swap-out command. In response to the received zswap-offload-store command, the near-memory processing unit 290 may read a page stored in the normal memory space 271 and compress the page through the zswap compressor 293.

Similarly, the near-memory processing unit 290 may receive a swap-in command from the host 100. The swap-in command may be a command for decompressing a compressed page stored in a compressed memory space and storing the decompressed page in a normal memory space. For instance, the swap-in command may include instructions to search an entry tree for an address for compressed data, read the address of the compressed data, decompress the compressed data, copy the decompressed data into a normal memory space, update an entry tree based on the decompressed data, or perform some combination of these operations. The near-memory processing unit 290 may receive a zswap-offload-load command as the swap-in command. In response to the received zswap-offload-load command, the near-memory processing unit 290 may read a compressed page stored in the compressed memory space 273 and decompress the compressed page through the zswap decompressor 295.

The data processing device 280 may perform functions such as compression, decompression, and memory area management based on being implemented near or inside the memory 270, and may thereby process pages efficiently. For example, the data processing device 280 may be implemented in a memory buffer of a dual in-line memory module (DIMM) to process data. In this example, the near-memory processing unit 290 may process data while efficiently using an internal bandwidth of the DIMM.

Figure 3A:
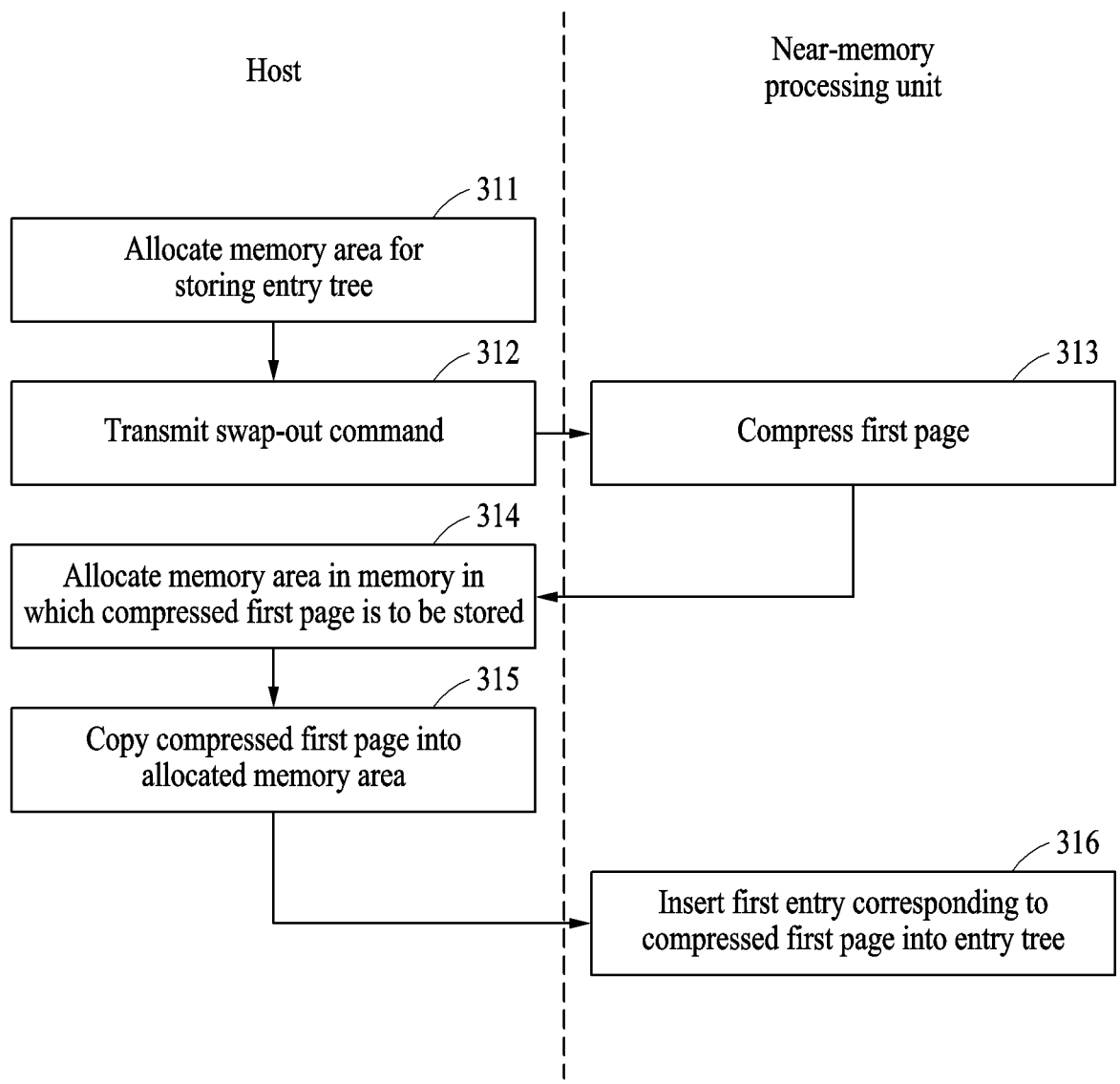
FIGS. 3A and 3B illustrate operations of a host transmitting a swap-out command and a near-memory processing unit receiving the swap-out command.
Figure 3B:
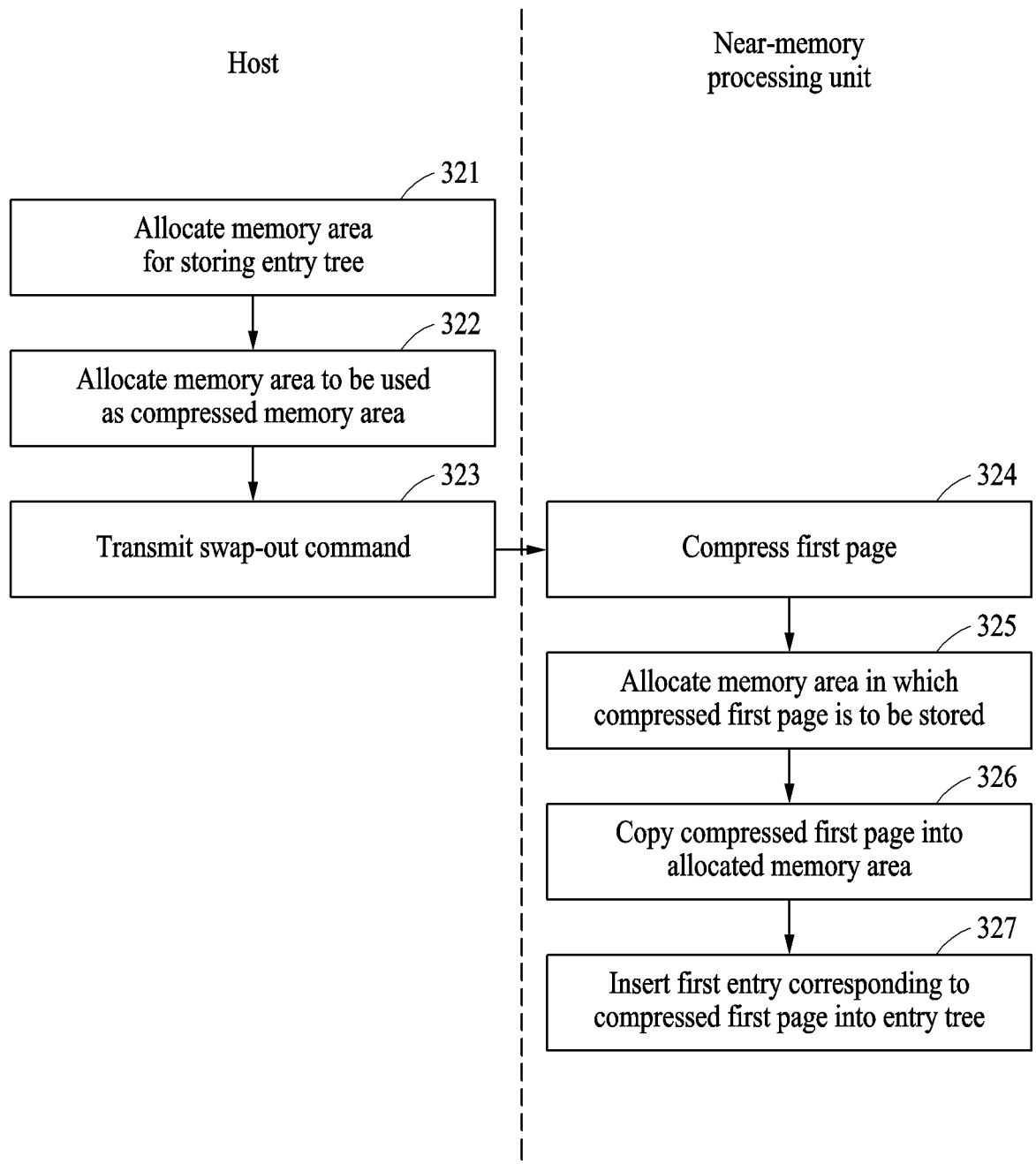

FIGS. 3A and 3B illustrate operations of a host transmitting a swap-out command and a near-memory processing unit receiving the swap-out command.

According to an example embodiment, a near-memory processing unit (e.g., the near-memory processing unit 130 of FIG. 1 or the near-memory processing unit 290 of FIG. 2) may be implemented inside a memory of a DIMM, an acceleration DIMM (AXDIMM), or a compute express link (CXL)-AXDIMM (CXL-AXDIMM).

FIG. 3A illustrates operations of a host transmitting a swap-out command and a near-memory processing unit receiving the swap-out command according to a comparative example embodiment.

According to the comparative example embodiment, in operation 311, the host may allocate a memory area for storing an entry tree configured in a tree structure that is based on one or more compressed pages. In operation 312, the host may transmit a swap-out command to the near-memory processing unit.

In operation 313, in response to the swap-out command being received, the near-memory processing unit may compress a first page. The near-memory processing unit may transmit, to the host, a resulting value obtained from the compression of the first page (which will be hereinafter referred to as a "compressed first page"). The first page may include one or more pages.

In some embodiments, the compression is based on a lossless compression algorithm that enables information to be represented with a reduced number of bits. For example, the compression may be based on a Lempel-Ziv-Oberhumer (LZO) algorithm, a DEFLATE algorithm, or another suitable compression algorithm.

In operation 314, the host may receive the compressed first page from the near-memory processing unit, and allocate a memory area in a memory in which the compressed first page is to be stored based on size information of the compressed first page. In operation 315, the host may copy the compressed first page into the allocated memory area.

In operation 316, the near-memory processing unit may insert a first entry corresponding to the compressed first page into the entry tree.

In the comparative example embodiment, an operation (e.g., operation 314) of allocating a memory area in which a compressed first page is to be stored and an operation (e.g., operation 315) of copying the compressed first page may be performed after an operation (e.g., operation 313) of compressing the first page. This may be because the size of the compressed first page generated by the near-memory processing unit may be non-deterministic (e.g., may change). In addition, in the comparative example embodiment, because the size of the compressed first page may be non-deterministic, the host may allocate a memory area in which the compressed first page is to be stored after the size of the compressed first page is determined, and thus the operation (e.g., operation 314) of allocating the memory area in which the first page is to be stored and the operation (e.g., operation 315) of copying the compressed first page may be performed by the host. Because the near-memory processing unit performs the operation of compressing the first page, and the host performs the operation of allocating the memory area in which the first page is to be stored and the operation of copying the compressed first page, off-chip communication may occur frequently between the host and the near-memory processing unit. Such frequent off-chip communication may increase data access latency and external bus traffic.

FIG. 3B illustrates operations of a host transmitting a swap-out command and a near-memory processing unit receiving the swap-out command according to an example embodiment.

According to an example embodiment, in operation 321, a host (e.g., the host 100 of FIG. 1) may allocate a memory area for storing an entry tree. In operation 322, the host may allocate in advance a compressed memory space that is a memory area in a memory in which a compressed page may be stored. That is, the host may allocate in advance a memory area in the memory to be used as the compressed memory space in the memory.

Subsequently, in operation 323, the host may transmit a swap-out command to the near-memory processing unit. For example, the host may transmit a zswap-offload-store command to the near-memory processing unit.

In operation 324, a memory controller of the near-memory processing unit may compress a first page in response to the swap-out command being received from the host.

In operation 325, the memory controller of the near-memory processing unit may allocate a memory area in which the compressed first page is to be stored in the compressed memory space of the memory.

In operation 326, the memory controller of the near-memory processing unit may copy the compressed first page into the allocated area in the compressed memory space.

In operation 327, the memory controller of the near-memory processing unit may generate a first entry corresponding to the compressed first page and insert the first entry into an entry tree to update the entry tree. The near-memory processing unit may use a binary tree, for example, a red-black tree algorithm, to generate the entry tree.

In the example embodiment, the compressed memory space in the memory may be allocated in advance by the host before the compression of the first page is performed by a compressor. In the example embodiment, as the host allocates in advance the memory area of the compressed memory space, the near-memory processing unit may allocate a memory area in which the compressed first page is to be stored in the compressed memory space, and the near-memory processing unit may copy the compressed first page into the allocated memory area. The near-memory processing unit may calculate a size of the compressed first page and allocate a memory area in the compressed memory space corresponding to the size of the compressed first page. The allocated memory area may correspond to the memory area in which the compressed first page is to be stored. In contrast, in the comparative example embodiment, since the host may not allocate in advance a memory area (e.g., a compressed memory space) in which a compressed page is to be stored, the host may allocate a memory area in which a compressed page is to be stored each time compression is performed by the near-memory processing unit.

Accordingly, the host may offload, to the near-memory processing unit, an operation (e.g., operation 325) of allocating a memory area in which a compressed first page is to be stored and an operation (e.g., operation 326) of copying the compressed first page into the allocated area of the compressed memory space. Offloading may refer to a hardware technique by which an accelerator (e.g., the near-memory processing unit) performs an operation in place of a host in a computing system to improve the performance of the host. According to the example embodiment, such offloading may enable the host to minimize off-chip communication between the host and the near-memory processing unit and may effectively reduce data access latency and external bus traffic.

Figure 4A:
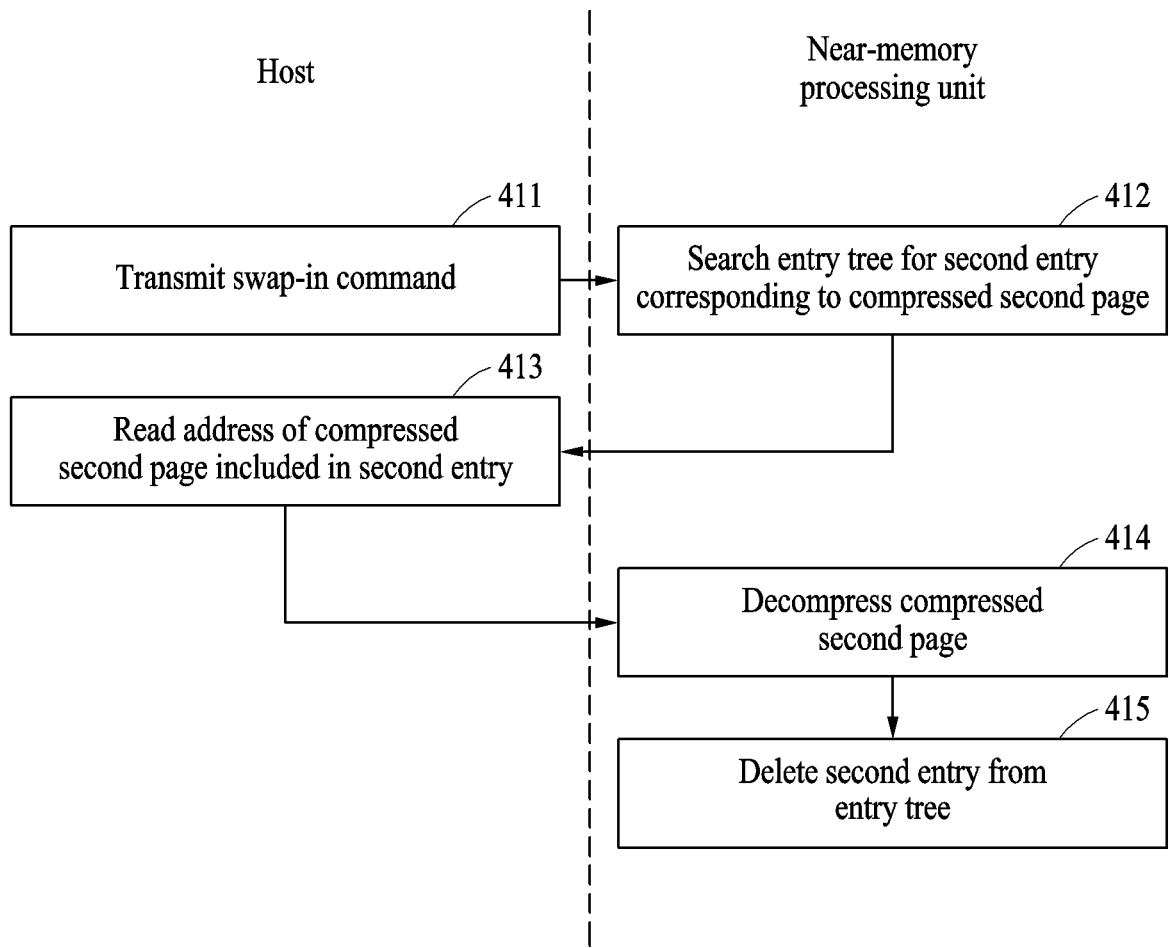
FIGS. 4A and 4B illustrate operations of a host transmitting a swap-in command and a near-memory processing unit receiving the swap-in command.
Figure 4B:
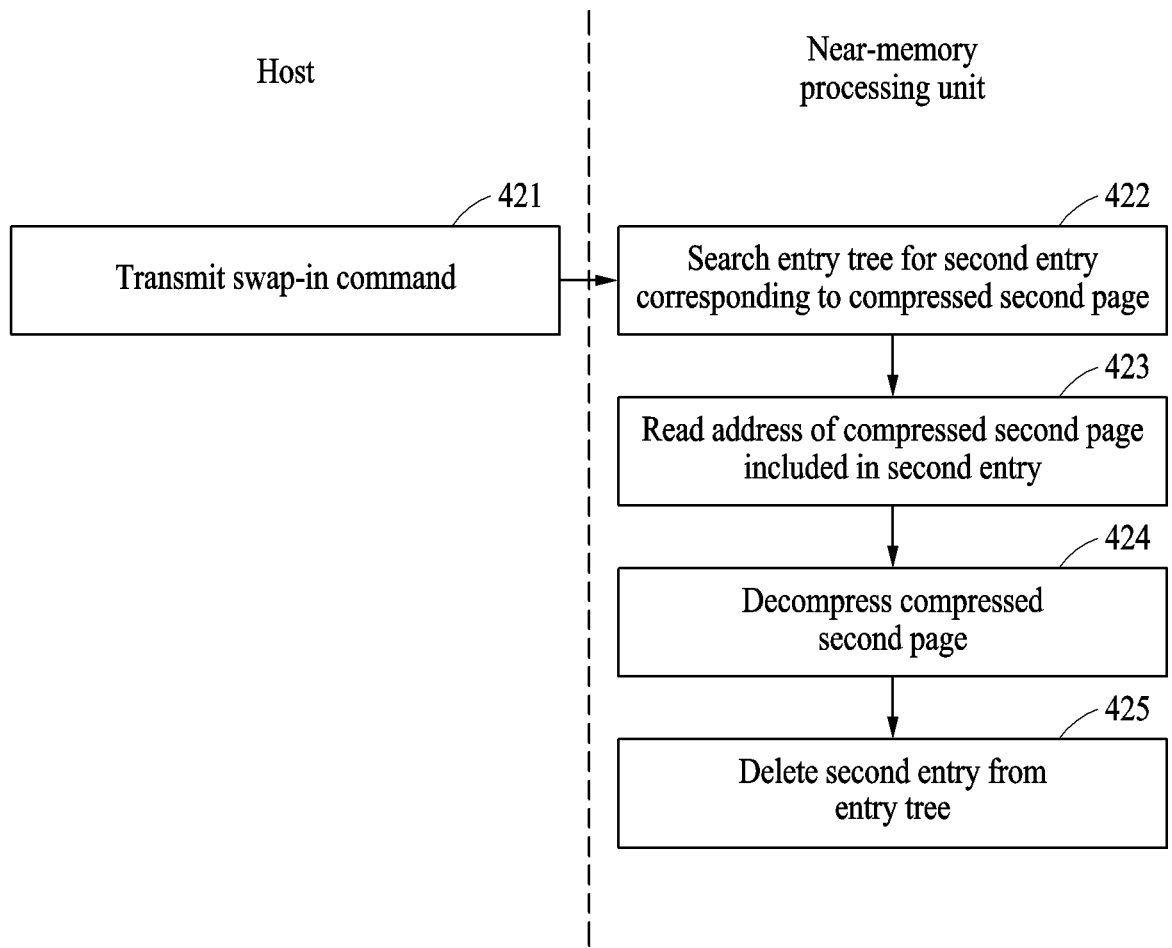

FIGS. 4A and 4B illustrate operations of a host transmitting a swap-in command and a near-memory processing unit receiving the swap-in command.

FIG. 4A illustrates operations of a host transmitting a swap-in command and a near-memory processing unit receiving the swap-in command according to a comparative example embodiment.

In the comparative example embodiment, in operation 411, a host (e.g., the host 100 of FIG. 1 or the host 210 of FIG. 2) may transmit a swap-in command to a near-memory processing unit (e.g., the near-memory processing unit 130 of FIG. 1 or the near-memory processing unit 290 of FIG. 2).

In operation 412, in response to the swap-in command being received, the near-memory processing unit may search an entry tree for a second entry corresponding to a compressed second page. The near-memory processing unit may transmit the retrieved second entry to the host.

In operation 413, the host may receive the second entry from the near-memory processing unit and may read an address of the compressed second page included in the second entry. In this case, the address of the compressed second page may be an address of a memory area in which the compressed second page is stored in a compressed memory space of a memory. The host may transmit the address of the compressed second page to the near-memory processing unit.

In operation 414, the near-memory processing unit may read the compressed second page from the address of the compressed second page received from the host, and the near-memory processing unit may decompress the compressed second page. In operation 415, the near-memory processing unit may delete the second entry corresponding to the compressed second page from the entry tree.

In the comparative example embodiment, since the near-memory processing unit transmits the second entry retrieved from the entry tree to the host and receives the address of the compressed second page included in the second entry from the host, there may be frequent occurrences of off-chip communication between the host and the near-memory processing unit. This frequent off-chip communication may increase data access latency and external bus traffic.

FIG. 4B illustrates operations of a host transmitting a swap-in command and a near-memory processing unit receiving the swap-in command according to an example embodiment.

According to an example embodiment, in operation 421, the host (e.g., host 100 of FIG. 1 or the host 210 of FIG. 2) may transmit a swap-in command to the near-memory processing unit (e.g., the near-memory processing unit 130 of FIG. 1 or the near-memory processing unit 290 of FIG. 2).

In operation 422, in response to the swap-in command being received, a memory controller of the near-memory processing unit may search an entry tree for a second entry corresponding to a compressed second page. The compressed second page may be in a compressed memory space of a memory.

In operation 423, the memory controller of the near-memory processing unit may read an address of the compressed second page included in the second entry. In operation 424, the memory controller of the near-memory processing unit may read the compressed second page from the address of the compressed second page and decompress the compressed second page. In operation 425, the near-memory processing unit may update the entry tree by deleting the second entry corresponding to the compressed second page from the entry tree.

According to the example embodiment, the host may offload, to the near-memory processing unit, an operation (e.g., operation 423) of reading the address of the compressed second page included in the second entry. According to the example embodiment, such offloading may enable the host to minimize off-chip communication between the host and the near-memory processing unit, and may effectively reduce data access latency and external bus traffic.

Figure 5:
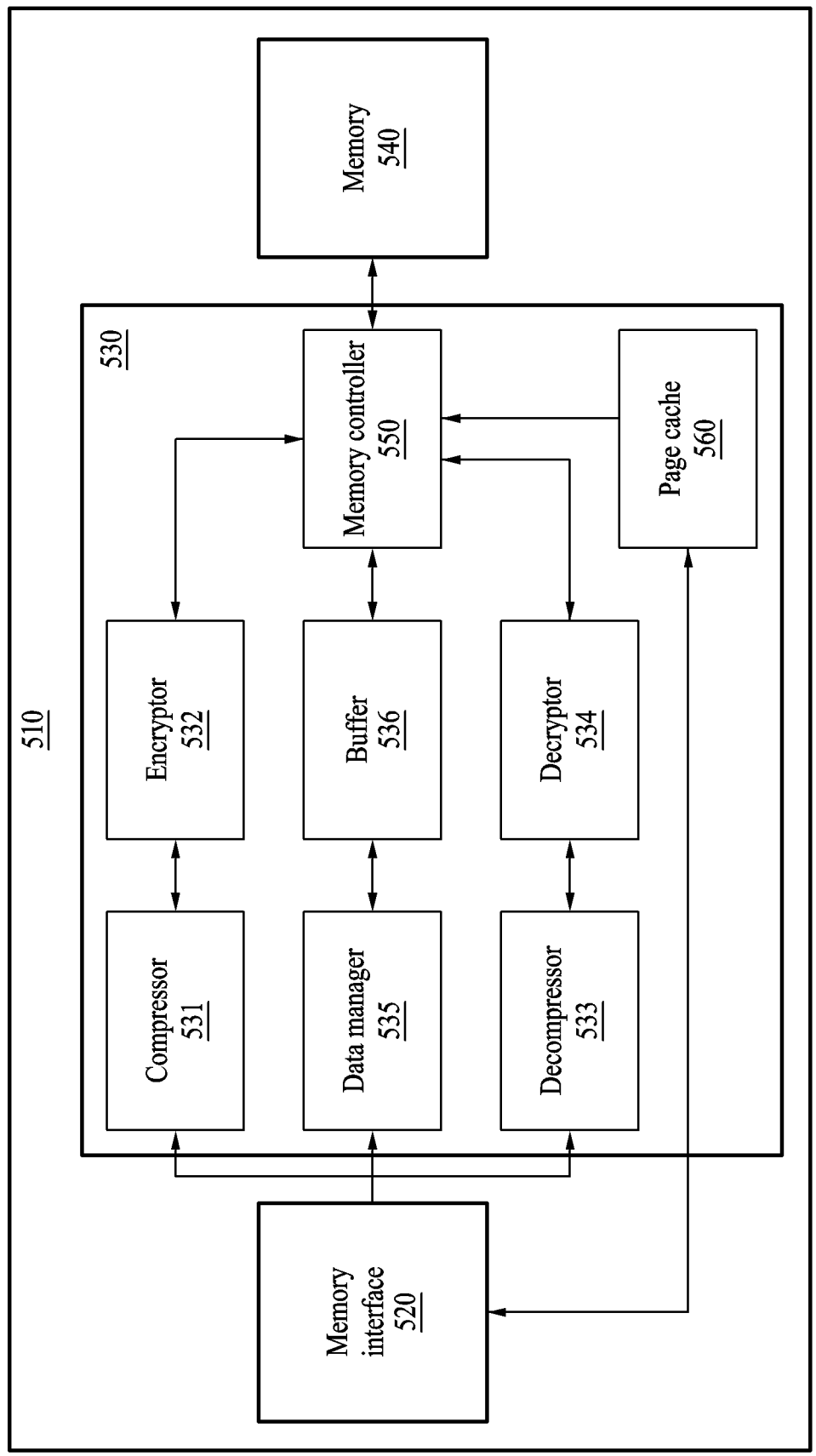
FIG. 5 illustrates an example of a near-memory processing unit implemented in a compute express link (CXL) memory.

FIG. 5 illustrates an example of a near-memory processing unit implemented in a CXL memory.

Referring to FIG. 5, a near-memory processing unit 530 (e.g., the near-memory processing unit 130 of FIG. 1 or the near-memory processing unit 290 of FIG. 2) may be implemented inside a CXL memory 510.

The CXL memory 510 may include a memory interface 520 configured to provide communication with external devices, the near-memory processing unit 530, and a memory 540 in which pages are stored. The near-memory processing unit 530 may include a compressor 531, an encryptor 532, a decompressor 533, a decryptor 534, a data manager 535, a buffer 536, a memory controller 550, and a page cache 560.

The near-memory processing unit 530 may operate in a CXL mode for processing CXL commands and in a zswap mode for zswap acceleration. The CXL mode may be a mode relating to general CXL access, and the zswap mode may be a mode relating to CXL access for zswap acceleration.

The near-memory processing unit 530 may use a specific area of a CXL memory address as a control address for a change to a corresponding mode (e.g., the CXL mode or the zswap mode). The near-memory processing unit 530 may specify a CXL mode configuration (CXL-MODE-CONFIG) as the control address for changing the mode (e.g., the CXL mode or the zswap mode). For example, when the CXL mode configuration corresponds to the zswap mode, the near-memory processing unit 530 may perform a command processing function for zswap acceleration.

The near-memory processing unit 530 may define a CXL mode status (CXL-MODE-STATUS). The host may check a status of the CXL memory 510 through the CXL mode status. A status recordable in a CXL mode status area may include a current mode and a CXL status. The CXL status may represent a status of being capable of cooperating with the host, such as, for example, CMD Done, BUSY, READY, or IDLE.

The memory controller 550 may process a zswap command (e.g., a zswap-offload-store command or a zswap-offload-load command) received from the host.

The near-memory processing unit 530 may receive the zswap-offload-store command from the host. The memory controller 550 may read a page present in a normal memory space of the memory 540, encrypt the page through the encryptor 532, and transmit the encrypted page to the compressor 531. The compressor 531 may compress the page. After compressing the page, the compressor 531 may encrypt once again the compressed page through the encryptor 532 and transmit the encrypted page to the memory controller 550. That is, the memory controller 550 may encrypt a page read from the normal memory space once through the encryptor 532 before compressing the page and may then encrypt once again through the encryptor 532 after compressing the page. However, examples are not limited thereto, and the number of encryptions through an encryptor may be greater or less than the number in the foregoing example. The memory controller 550 may store the compressed page in a compressed memory space of the memory 540. The memory controller 550 may newly add, to an entry tree, an entry generated based on meta information of the compressed page through the data manager 535. The data manager 535 may update the entry tree including entries corresponding to one or more pieces of compressed data. The data manager 535 may store the entry tree in the buffer 536.

When the near-memory processing unit 530 receives the zswap-offload-load command from the host, the memory controller 550 may (e.g., through the data manager 535) search the entry tree for an entry corresponding to a compressed page to be swapped in, and the memory controller 550 may read an address of the compressed page. The memory controller 550 may read the compressed page from the address of the compressed page, decrypt the compressed page through the decryptor 534, and transmit the decrypted page to the decompressor 533. The decompressor 533 may decompress the compressed page. After decompressing the compressed page, the decompressor 533 may decrypt once again the compressed page through the decryptor 534 and transmit the decrypted page to the memory controller 550. That is, the memory controller 550 may decrypt a compressed page read from the compressed memory space through the decryptor 534 once before decompressing it, and then decrypt the page once again after decompressing it through the decryptor 534. However, examples are not limited thereto, and the number of decryptions by a decryptor may be greater or less than the number in the foregoing example. The memory controller 550 may delete, from the entry tree, the entry corresponding to the compressed page through the data manager 535.

According to an example embodiment, the near-memory processing unit 530 may further include a page cache 560 configured to manage memory areas of the compressed memory space of the memory 540. The near-memory processing unit 530 may manage allocation of a memory area in which a compressed page is to be stored, through the page cache 560. A role of the page cache 560 will be described in more detail below with reference to FIG. 6.

Figure 6:
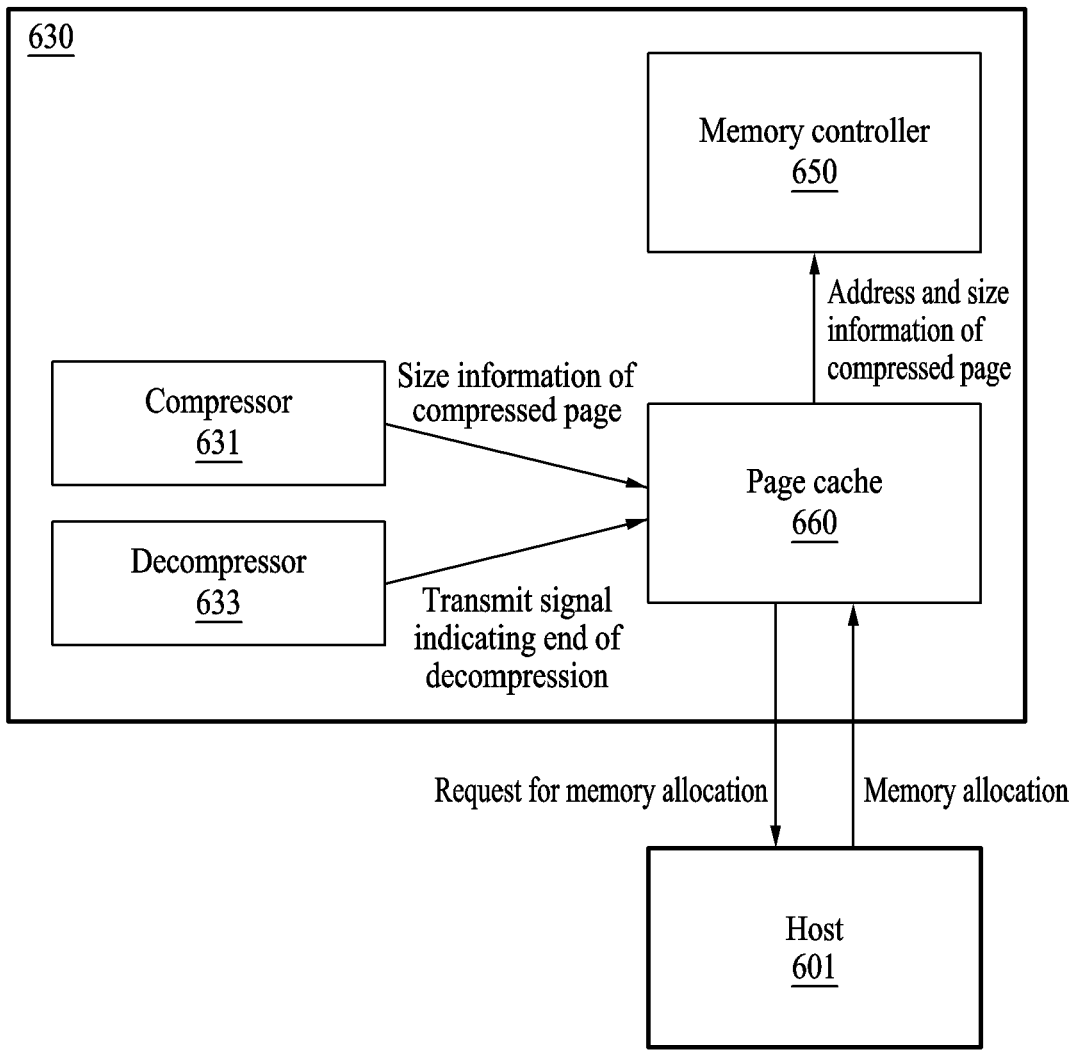
FIG. 6 illustrates a process in which a near-memory processing unit manages a compressed page through a page cache.

FIG. 6 illustrates a process in which a near-memory processing unit manages a compressed page through a page cache.

According to an example embodiment, a near-memory processing unit (e.g., the near-memory processing unit 130 of FIG. 1 or the near-memory processing unit 290 of FIG. 2) may manage allocation of memory areas in a compressed memory space through a page cache 660.

A host may allocate in advance a memory area to the compressed memory space of the memory in various ways. According to an example embodiment, the host may allocate in advance a specific memory space as a memory area of the compressed memory space in an initialization process of zswap. This may allow an operating system (OS) to avoid managing the memory and may thereby reduce the burden of the OS for managing the memory. Instead, hardware may manage the memory and may thereby minimize performance overhead that may be caused by memory allocation and memory deallocation. However, the memory space previously allocated as the compressed memory space may be unavailable to other applications, and the memory may be wasted when zswap is not used heavily. According to another example embodiment, to avoid wasting memory, the host may utilize an on-demand paging method to allow the OS to add a memory area to the compressed memory space when appropriate. The host may allocate in advance a memory area of a specific size as a memory area of the compressed memory space and allow hardware to manage the memory area until the memory area is fully utilized. For example, the host may pre-allocate a 4 KB memory area or a 64 KB memory area for the compressed memory space and transmit an address of the memory area to a page cache using a command to allow the page cache to manage the memory area. The page cache may store a compressed page by distributing a portion of the memory area according to the size of the compressed page. When the memory area pre-allocated to the compressed memory space becomes insufficient, the page cache may request for the OS (e.g., a CPU) to allocate a new memory area, and the OS may allocate an additional memory area to the compressed memory space to perform a zswap operation. This method may minimize memory waste and may greatly reduce memory allocation and deallocation overhead. Hereinafter, the pre-allocation of a memory area to the compressed memory space by the host using the on-demand paging method may be described.

First, after a near-memory processing unit 630 receives a swap-out command, a compressor 631 may compress a page and transmit size information of the compressed page to the page cache 660. The compressor 631 may transmit the size information of the compressed page to the page cache 660 and may simultaneously request the page cache 660 to allocate a memory area for storing the compressed page in the compressed memory space.

According to an example embodiment, the page cache 660 may manage a total used page (e.g., a total used page value) indicating the number of compressed pages in the compressed memory space. When the total used page exceeds a threshold number of pages, the page cache 660 may request for the host to allocate an additional memory area to the compressed memory space. In this case, the threshold number of pages may be set to be less than or equal to a maximum number of pages that are currently available to be stored in the compressed memory space. In response to such a request for the additional allocation of a memory area to the compressed memory space from the page cache 660, the host may allocate an additional memory area to the compressed memory space.

In response to the size information of the compressed page being received from the compressor 631, the page cache 660 may increase the total used page by the size of the compressed page. The page cache 660 may specify an address of a memory area in which the compressed page is to be stored in the compressed memory space, and the page cache 660 may transmit the specified address and the size information of the compressed page to a memory controller 650. The memory controller 650 may allocate a memory area indicated by (e.g., corresponding to) the address received from the page cache 660 to the compressed page. The memory controller 650 may copy and store the compressed page in the memory area indicated by the received address. In addition, the memory controller 650 may generate an entry based on meta information of the compressed page including the address of the compressed page and the size information of the compressed page.

After the near-memory processing unit 630 receives a swap-in command, a decompressor 633 may decompress a compressed page. After decompressing the compressed page, the decompressor 633 may transmit a signal indicating the end of the decompression of the compressed page to the page cache 660. In response to receiving the signal indicating the end of the decompression of the compressed page, the page cache 660 may decrease the total used page by a size of the compressed page.

Figure 7:
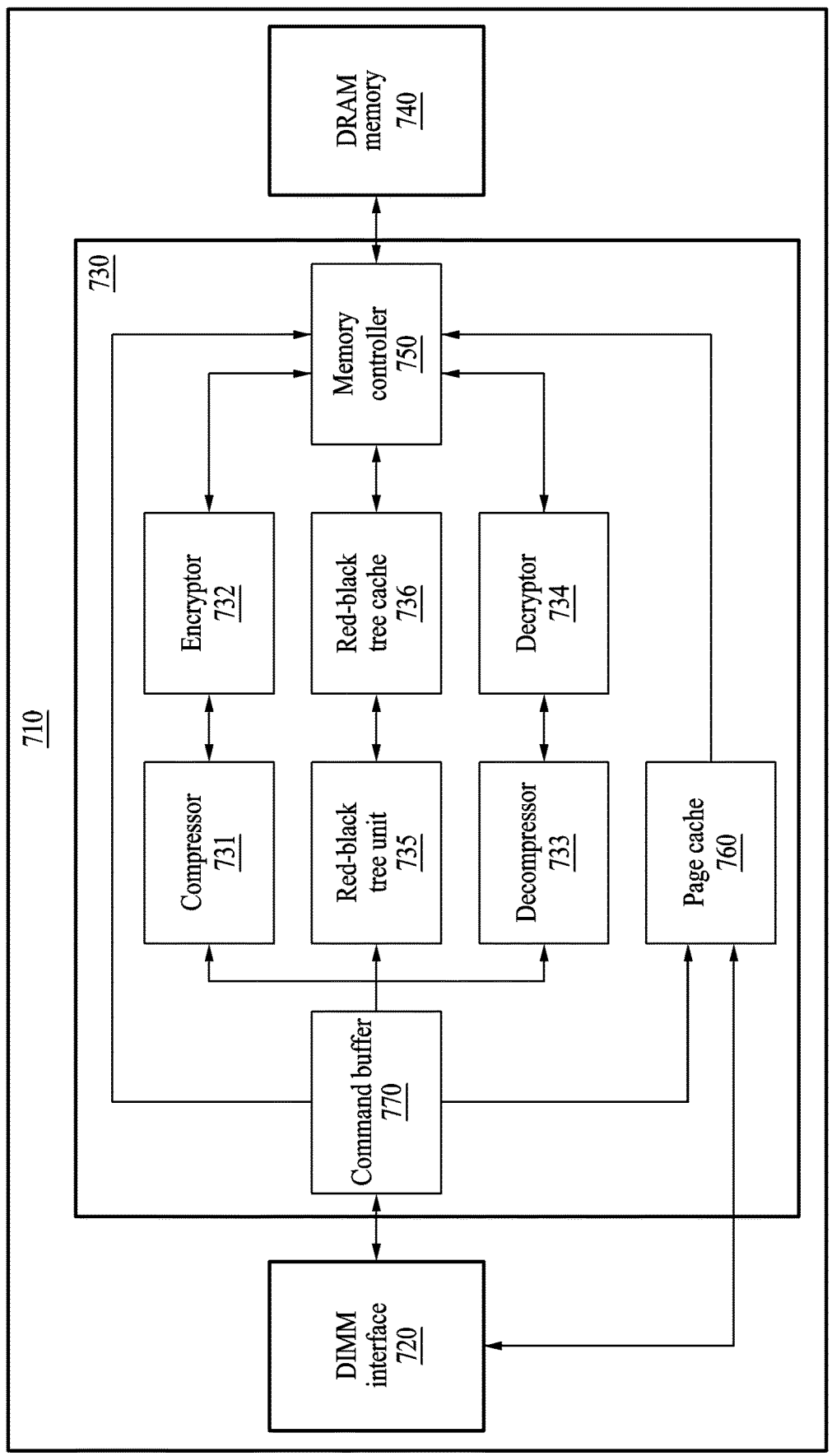
FIG. 7 illustrates an example of a near-memory processing unit implemented in a dual in-line memory module (DIMM) memory.

FIG. 7 illustrates an example of a near-memory processing unit implemented in a DIMM memory.

Referring to FIG. 7, a near-memory processing unit 730 (e.g., the near-memory processing unit 130 of FIG. 1 or the near-memory processing unit 290 of FIG. 2) may be implemented inside a DIMM memory 710.

The DIMM memory 710 may include a DIMM interface 720 configured to provide communication with external devices, a near-memory processing unit 730, and a DRAM memory 740 in which data is stored. The near-memory processing unit 730 may include a compressor 731, an encryptor 732, a decompressor 733, a decryptor 734, a red-black tree (or RBT) unit 735, a red-black tree cache 736, a memory controller 750, a page cache 760, and a command buffer 770. The page cache 760 may also be referred to as an address cache. The red-black tree unit 735 may update an entry tree including entries corresponding to one or more pieces of compressed data, and the red-black tree unit 735 may store the entry tree in the red-black tree cache 736.

A host (e.g., the host 100 of FIG. 1 or the host 210 of FIG. 2) may transmit a swap-out command to the near-memory processing unit 730. The host may transmit, to the near-memory processing unit 730, a zswap-offload-store command including a type of a last swap space of a page to be compressed, offset information that is position information associated with a position at which the page to be compressed is stored, and information as to whether the page is encrypted and whether the page is compressed. The near-memory processing unit 730 may, through the page cache 760, convert the command type and the offset information to an address of a memory area in the compressed memory space in which the compressed page is to be stored. That is, the page cache 760 may manage the memory area of the compressed memory space and generate the address of the memory area in the compressed memory space in which the compressed page is to be stored. The near-memory processing unit 730 may perform encryption and compression through the encryptor 732 and the compressor 731, respectively, according to information on the encryption and compression included in the received command. The near-memory processing unit 730 may store the compressed page in the address of the memory area generated by the page cache 760.

The host may transmit a swap-in command to the near-memory processing unit 730. The host may transmit, to the near-memory processing unit 730, a zswap-offload-load command including information on whether the compressed page is encrypted. The near-memory processing unit 730 may search the entry tree stored in the red-black tree cache 736 for an entry corresponding to the compressed page. The address of the compressed page and the size information of the compressed page may be stored in the entry. Based on whether the compressed page is encrypted, the near-memory processing unit 730 may perform decryption and decompression through the decryptor 734 and the decompressor 733, respectively. The near-memory processing unit 730 may store the decompressed page in a normal memory space of the memory.

Further, the near-memory processing unit 730 may store address conversion information of a frequently accessed swap page in the page cache 760 to additionally improve data processing performance.

Figure 8:
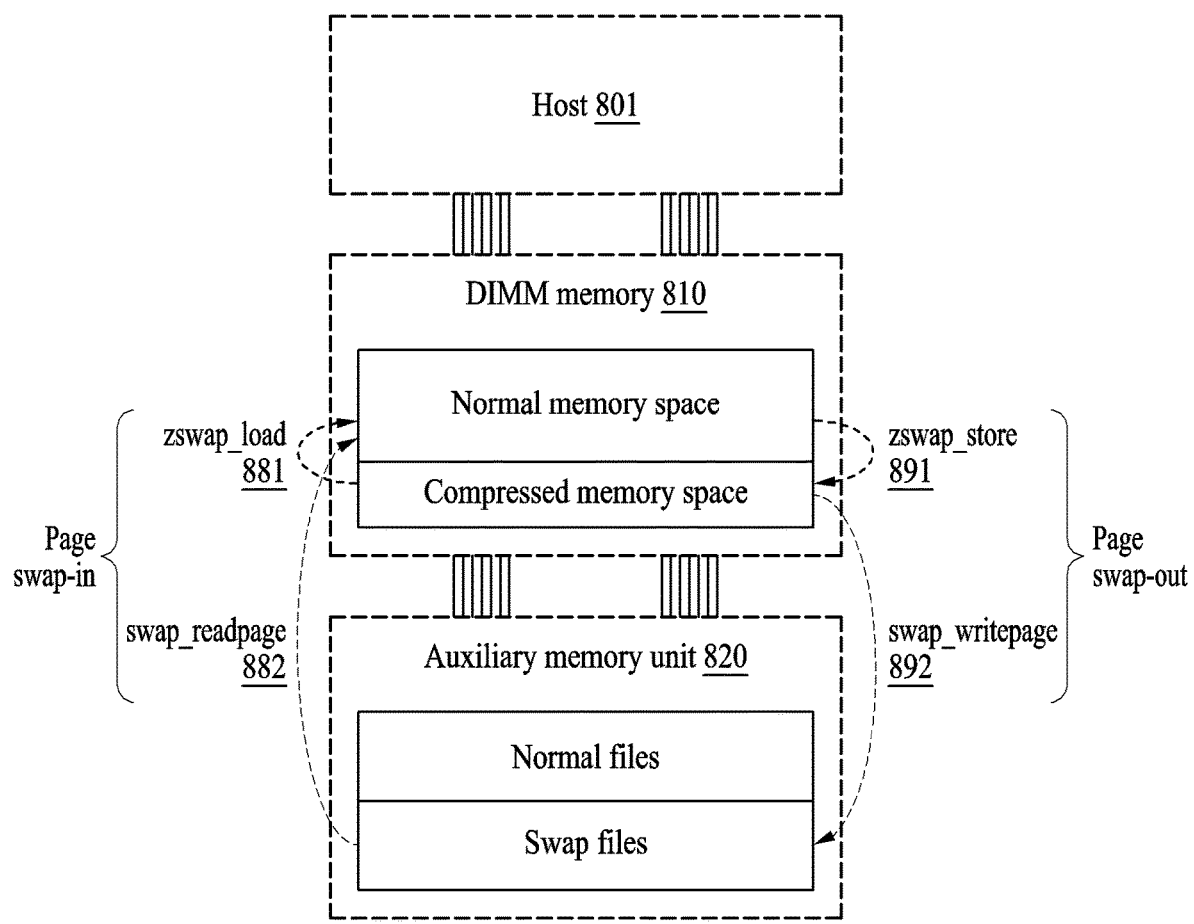
FIG. 8 illustrates an example of a near-memory processing unit implemented in a DIMM memory.

FIG. 8 illustrates an example of a near-memory processing unit implemented in a DIMM memory.

Referring to FIG. 8, a near-memory processing unit according to an example embodiment may be implemented inside a DIMM memory 810. In a structure of the DIMM memory 810 that includes a plurality of channels, a zswap space may be allocated to each channel.

The DIMM memory 810 may perform a page swap-out operation. The DIMM memory 810 may receive a swap-out command from a host 801, and the DIMM memory 810 may perform a zswap operation 891 of compressing data present in a normal memory space and storing the compressed data in a compressed memory space. In addition, in a situation in which there is a high memory load due to continuous requests for memory from external devices, the DIMM memory 810 may perform a move operation 892 to move the data stored in the compressed memory space to swap files of an auxiliary memory unit 820 to secure a space in main memory.

In some examples, the DIMM memory 810 may perform a page swap-in operation. The DIMM memory 810 may receive a swap-in command from the host 801, and the DIMM memory 810 may perform a zswap operation 881 of decompressing data present in the compressed memory space and storing the data in the normal memory space. In addition, when data to be used is moved to the swap files of the auxiliary memory unit 820, the DIMM memory 810 may perform a read operation 882 to read the corresponding data from the swap files of the auxiliary memory unit 820, and the DIMM memory 810 may decompress and store the data in the normal memory space.

Figure 9:
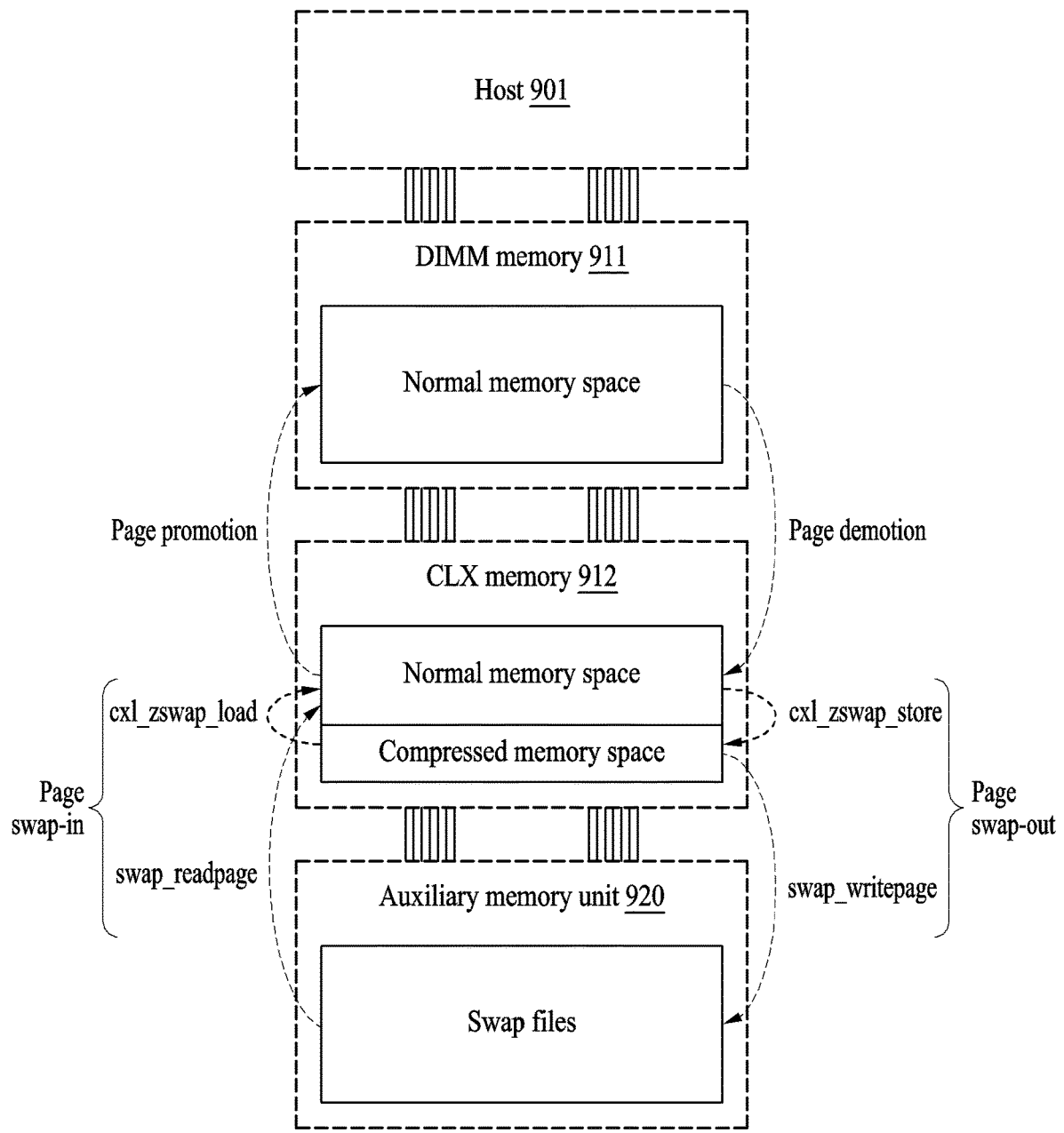
FIG. 9 illustrates an example of an application of a near-memory processing unit to a tiered memory system.

FIG. 9 illustrates an example of an application of a near-memory processing unit to a tiered memory system.

FIG. 9 illustrates an example tiered memory system including a MINIM memory 911 and a CXL memory 912. The tiered memory system may use the DIMM memory 911 as a main memory, use the CXL memory 912 (e.g., which may be less fast than the DIMM memory 911) as an auxiliary memory, and use an auxiliary memory unit (e.g., SSD) as a storage.

The DIMM memory 911, the CXL memory 912, and the auxiliary memory unit 920 may have different access latencies according to device characteristics and connected interfaces (e.g., DDR bus and PCIe). The DIMM memory 911, which is nearest to a host 901, may have the shortest access latency, and the access latency may be shorter for the CXL memory 912 than for the auxiliary memory unit 920.

The DIMM memory 911 and the CXL memory 912 may be directly allocated to an application program executed on the host 901 and may be accessible by the application program, and data in the two memories may be movable between the DIMM memory 911 and the CXL memory 912 according to an access characteristic of the data. For example, to maximize the performance of the DIMM memory 911, the host 901 may allocate hot data with the highest access frequency to the DIMM memory 911 and move cold data with a low access frequency to the CXL memory 912 which is relatively slow. When the cold data is accumulated in the CXL memory 912, a memory space of the CXL memory 912 may become insufficient, and cold data with the least access frequency may be swapped out to the auxiliary memory unit 920 to secure memory space. In this case, to minimize the performance degradation due to the access to the auxiliary memory unit 920, a portion of the memory space of the CXL memory 912 may be used as a compressed memory space. That is, a near-memory processing unit may be implemented inside the CXL memory 912. In this case, moving pieces of data stored in the CXL memory 912 to the compressed memory space may minimize data movements between different memories.

The present description describes additional aspects of the methods, apparatuses, and/or systems related to the disclosure. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

Accordingly, the features described herein may be embodied in different forms and are not to be construed as being limited to the example embodiments described herein. Rather, the example embodiments described herein have been provided merely to illustrate some of the many possible ways of implementing the methods, apparatuses, and/or systems described herein that will be apparent after an understanding of the disclosure of this application. As used herein, "A or B," "at least one of A and B," "at least one of A or B," "A, B, or C," "at least one of A, B, and C," and "A, B, or C," may each include any one of the items listed together in the corresponding one of the phrases, or all possible combinations thereof.

Terms, such as first, second, and the like, may be used herein to describe components. Each of these terminologies may not define an essence, order or sequence of a corresponding component but may merely distinguish a component from other component(s). For example, a first component may be referred to as a second component, and similarly the second component may also be referred to as the first component. Throughout the disclosure, when an element is described as "connected to" or "coupled to" another element, it may be directly "connected to" or "coupled to" the other element, or there may be one or more other elements intervening therebetween. In contrast, when an element is described as "directly connected to" or "directly coupled to" another element, there may be no other elements intervening therebetween.

The terminology used herein is for describing various example embodiments only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

The term "unit" or the like used herein may refer to a software or hardware component, such as a field-programmable gate array (FPGA) or an ASIC, and the "unit" performs predefined functions. However, "unit" is not limited to software or hardware. The "unit" may be configured to be in an addressable storage medium or configured to operate one or more processors. The "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate one or more central processing units (CPUs) within a device or a security multimedia card. In addition, "unit" may include one or more processors.

Also, in the description of example embodiments, description of structures or functions that are thereby known after an understanding of the disclosure of the present application will be omitted when it is deemed that such description will cause ambiguous interpretation of the example embodiments. Example embodiments are described with reference to the accompanying drawings, and like reference numerals in the drawings refer to like elements throughout.

The examples described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, an FPGA, a programmable logic unit (PLU), a microprocessor, or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as, parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A near-memory processing unit, comprising:
   a compressor configured to, in response to a swap-out command received from a host, compress a page disposed in a normal memory space of a memory to obtain a compressed page, wherein the near-memory processing unit is separated from the host; and
   a memory controller configured to, in response to the swap-out command, store the compressed page in a compressed memory space.

2. The near-memory processing unit of claim 1, wherein the memory controller is further configured to, in response to the swap-out command:

allocate a memory area in which the compressed page is to be stored in the compressed memory space of the memory;

copy the compressed page into the allocated memory area; and update an entry tree configured in a tree structure that is based on one or more compressed pages by generating an entry corresponding to the compressed page and inserting the entry into the entry tree.

3. The near-memory processing unit of claim 1, wherein the compressed memory space is a memory area allocated in advance in the memory by the host before the page is compressed by the compressor.

4. The near-memory processing unit of claim 1, further comprising:

a page cache configured to manage memory areas of the compressed memory space, wherein the page cache is configured to:

manage a total used page indicating the number of compressed pages in the compressed memory space, and request the host to additionally allocate a memory area to the compressed memory space in response to the total used page exceeding a threshold number of pages.

5. The near-memory processing unit of claim 4, wherein the compressor is configured to:

transmit size information of the compressed page to the page cache, and request the page cache to allocate a memory area for storing the compressed page in the compressed memory space.

6. The near-memory processing unit of claim 5, wherein the page cache is configured to:

in response to the size information of the compressed page received from the compressor, increase the total used page by a size of the compressed page.

7. The near-memory processing unit of claim 5, wherein the page cache is configured to:

specify an address of the memory area in which the compressed page is to be stored, and transmit the specified address and the size information of the compressed page to the memory controller, wherein the memory controller is configured to:

generate an entry of an entry tree based on meta information of the compressed page that comprises an address of the compressed page and the size information of the compressed page.

8. A near-memory processing unit, comprising:

a decompressor configured to, in response to a swap-in command received from a host, decompress a compressed page disposed in a compressed memory space of a memory to obtain a decompressed page, wherein the near-memory processing unit is separated from the host; and a memory controller configured to, in response to the swap-in command, store the decompressed page in a normal memory space of the memory.

9. The near-memory processing unit of claim 8, wherein the memory controller is further configured to, in response to the swap-in command:

search an entry tree configured in a tree structure that is based on one or more compressed pages for an entry corresponding to the compressed page;

read an address of the compressed page comprised in the entry; and update the entry tree by deleting the entry from the entry tree.

10. The near-memory processing unit of claim 8, further comprising:

a page cache configured to manage a memory area of the compressed memory space, wherein the page cache is configured to:

manage a total used page indicating the number of compressed pages in the compressed memory space, and request the host to additionally allocate a memory area to the compressed memory space in response to the total used page exceeding a threshold number of pages.

11. The near-memory processing unit of claim 10, wherein the memory controller is configured to:

read the compressed page, decrypt the compressed page through a decryptor, and transmit the decrypted page to the decompressor.

12. The near-memory processing unit of claim 10, wherein the decompressor is configured to:

transmit, to the page cache, a signal indicating an end of decompression of the compressed page, wherein the page cache is configured to:

when receiving the signal indicating the end of the decompression of the compressed page from the decompressor, decrease the total used page by a size of the compressed page.

13. A data processing method, comprising:

receiving, at a near-memory processing unit, a swap-out command from a host, wherein the host is separated from the near-memory processing unit;

in response to the received swap-out command, compressing a page disposed in a normal memory space of a memory;

allocating a memory area in which the compressed page is to be stored in a compressed memory space of the memory;

copying the compressed page into the allocated memory area; and updating an entry tree configured in a tree structure that is based on one or more compressed pages by generating an entry corresponding to the compressed page and inserting the entry into the entry tree.

14. The data processing method of claim 13, wherein the compressed memory space is a memory area allocated in advance in the memory by the host before the page is compressed.

15. The data processing method of claim 13, further comprising:

managing a total used page indicating the number of compressed pages in the compressed memory space; and when the total used page exceeds a threshold number of pages, requesting the host to additionally allocate a memory area to the compressed memory space.

16. The data processing method of claim 15, further comprising:

when the page has been compressed, increasing the total used page by a size of the compressed page.

17. The data processing method of claim 13, wherein the allocating of the memory area in which the compressed page is to be stored comprises:

specifying an address of the memory area in which the compressed page is to be stored, wherein the updating of the entry tree comprises:
generating the entry based on meta information of the compressed page that comprises an address of the compressed page and size information of the compressed page.

18. The data processing method of claim 13, further comprising:
receiving, at a near-memory processing unit, a swap-in command from a host, wherein the host is separated from the near-memory processing unit;
in response to the received swap-in command, searching an entry tree configured in a tree structure that is based on one or more compressed pages for an entry corresponding to a compressed page disposed in a compressed memory space of a memory;
reading an address of the compressed page comprised in the entry;
decompressing the compressed page; and
updating the entry tree by deleting the entry from the entry tree.

19. The data processing method of claim 18, further comprising:
managing a total used page indicating the number of compressed pages in the compressed memory space; and
when the total used page exceeds a threshold number of pages, requesting the host to additionally allocate a memory area to the compressed memory space.

20. The data processing method of claim 18, wherein the decompressing of the compressed page comprises:
reading the compressed page from the address of the compressed page, decrypting the compressed page through a decryptor, and transmitting the decrypted page to a decompressor,
and wherein the data processing method further comprises:
storing the page decompressed by the decompressor in a normal memory space of the memory.

* * * * *